3,755,596
STABILIZED INSECTECIDAL COMPOSITION EMPLOYING CERTAIN ACID STABILIZERS

Toshiaki Osugi, Takatsuki, Japan, assignor to Takeda Chemical Industries, Ltd., Higashi-ku, Osaka, Japan
No Drawing. Filed Mar. 6, 1970, Ser. No. 17,306
Claims priority, application Japan, Mar. 8, 1969, 44/17,662
Int. Cl. A01n 9/12
U.S. Cl. 424—300     11 Claims

ABSTRACT OF THE DISCLOSURE

Stable insecticidal preparations contain at least (1) an acid salt of a carbamoyl derivative represented by the general formula:

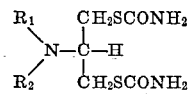

wherein $R_1$ and $R_2$ represent the same or different lower alkyl radical having up to 6 carbon atoms, or wherein $R_1$ and $R_2$ together with the nitrogen atom form a heterocyclic ring, (2) an organic acid compound and (3) a comminuted mineral carrier.

---

This invention relates to stabilized pesticidal preparations, more particularly, those made stable against storage for a relatively long period of time, which contain at least (1) an acid salt of a carbamoyl derivative represented by the general formula:

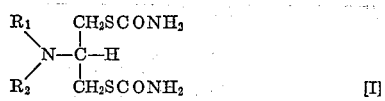

wherein $R_1$ and $R_2$ represent the same or different lower alkyl radical having up to 6 carbon atoms, or wherein $R_1$ and $R_2$ together with the nitrogen atom form a heterocyclic ring, (2) an organic acid compound and (3) a comminuted mineral carrier acceptable for pesticidal use.

The aforementioned carbamoyl derivatives [I] have been known as insecticidal chemicals for agricultural use which exhibit excellent pesticidal activity and are generally marketed in a form of an admixture with some carriers or diluents, that is to say, in such solid forms as dust, granule, soluble powder and wettable powder (see, for example, U.S. Pat. 3,332,943). The solid form pesticidal preparations are generally formulated by blending the active ingredient with comminuted mineral carrier acceptable for pesticidal use, such for example as, clay minerals, e.g. talc, clay, kaolin, kaolinite, bentonite, vermiculite, attapulgite, and diatomaceous earth, calcium lime, calcium carbonate, pyrophylite, etc. These solid preparations show an excellent pesticidal activity so far as they are used just after or soon after their production.

However, it was found that such solid preparations lose their activities, when they are applied for use after storage for a rather long time. That is to say, in any such preparation containing an admixture of an acid salt of a carbamoyl derivative [I] and a comminuted mineral carrier acceptable for pesticidal use, the acid salt of the carbamoyl derivative [I] is comparatively unstable so that when the preparation is left standing even at a room temperature, the active ingredient undergoes gradual degradation which leads to coloration or a reduced concentration of the active ingredient. For example, Table 1 shows the percent residue values of 1,3-bis(carbamoylthio)-2-(N,N-dimethylamino)-propane hydrochloride in 2% dust formulations after a varying time of storage at different temperatures.

TABLE 1.—PERCENT RESIDUES* OF 1,3-BIS(CARBAMOYL THIO)-2-(N,N-DIMETHYLAMINO)-PROPANE HYDROCHLORIDE IN 2% DUSTS

| | Temperature | | | | |
|---|---|---|---|---|---|
| | 60° C. | | | 40° C. | |
| Period | 5 days | 15 days | 30 days | 20 days | 41 days |
| Mineral powder: | | | | | |
| Air-classified clay (A) percent | 66.9 | 66.8 | 63.4 | 83.3 | 78.7 |
| Air-classified clay (B) percent | 45.2 | 6.6 | 6.9 | 71.2 | 60.4 |
| Talc, percent | 23.2 | 3.0 | 3.0 | 54.2 | 33.6 |
| Calcium carbonate, percent | 19.2 | 4.3 | 2.1 | 42.5 | 20.8 |

*Initial 100% (Assay method is described in detail in Example 1).

As shown in Table 1, such solid preparations as above are not suitable for keeping in storage without causing reduction of the initial concentration of the active ingredient, which is counted as one of the drawbacks from a practical point of view.

The present inventor conducted an extensive research in order to circumvent the foregoing disadvantage and has ultimately discovered that the stability of the active ingredient can be considerably enhanced by admixing an organic acid compound with a mixture of an acid salt of the unstable carbamoyl derivatives [I] and comminuted mineral carrier acceptable for pesticidal use.

The principal object of the present invention is to provide a solid preparation containing as the active ingredient the carbamoyl derivatives [I], in which the active ingredient is kept stable in storage for a long period of time at normal conditions.

Another object of this invention is to provide an agriculturally feasible and stabilized solid preparation of the compounds [I] against storage, high humidity, light, etc.

Other objects of the present invention and advantageous features thereof will become apparent as the description proceeds.

Said stabilized preparation is produced by admixing organic acid compounds with an acid salt of a carbamoyl derivative represented by the said formula [I] and a comminuted mineral carrier acceptable for pesticidal use.

Acid salt of carbamoyl derivatives [I] employable in this invention may be selected from among, for example, the salts of various organic or inorganic acids, such as hydrochloric acid, sulfuric acid, oxalic acid, etc., with various carbamoyl derivatives including, among others:

(1) 1,3-biscarbamoylthio-2-dimethylamino-propane;
(2) 1,3-bis-carbamoylthio-2-diethylamino-propane;
(3) 1,3-bis-carbamoylthio-2-dipropylamino-propane;
(4) 1,3-bis-carbamoylthio-2-diisopropylamino-propane;
(5) 1,3-bis-carbamoylthio-2-dibutylamino-propane;
(6) 1,3-bis-carbamoylthio-2-diamylamino-propane;
(7) 1,3-bis-carbamoylthio-2-dihexylamino-propane;
(8) 1,3-bis-carbamoylthio-2-methylethylamino-propane;
(9) 1,3-bis-carbamoylthio-2-piperidino-propane;
(10) 1,3-bis-carbamoylthio-2-pyrrolidino-propane;
(11) 1,3-bis-carbamoylthio-2-morpholino-propane;
(12) 1,3-bis-carbamoylthio-2-thiamorpholino-propane;

Said comminuted mineral carriers acceptable for pesticidal use may be exemplified by clay minerals (e.g. air-classified clay, water-classified clay, kaolin, kaolinite, vermiculite, pyrophyllite, montmorillonite, bentonite, fuller's earth, attapulgite, talc etc.), or diatomaceous earth, etc.

Said organic acid compounds may be exemplified by fatty acids such as acetic acid, propionic acid, oxalic acid, citric acid, tartaric acid, succinic acid, maleic acid, capric acid, caprylic acid, oleic acid, linoleic acid, linolenic acid, fumaric acid, tall oil fatty acid which contains a predominant amount of linoleic acid and oleic acid, or dialkyl hydrogen phosphate such as diisopropyl hydrogen phosphate, etc.

Mixing of such an organic acid compound as above with an acid salt of a carbamoyl derivative [I] and comminuted mineral carrier acceptable for pesticidal use may be effected by a conventional means, for example; when the organic acid compound is in the state of liquid, it may be added as it is, and when the organic acid is crystalline, it is convenient to add the same after comminuting, or, after dissolving in an organic solvent, the solution is sprayed onto the mixture of said active component and said mineral carrier.

Though there are suitable range of proportions of an organic acid compound to be added, depending on the concentration, kind and purity of said acid salt of carbamoyl derivative [I], storing conditions and other factors, its amount falls within the range, at least, from about 0.05 to about 10 weight percent, preferably, from about 0.1 to about 5 weight percent.

Even if two or more organic acid compounds are employed in combination, the sum of their proportions desirably lies in the range from about 0.05 to about 10 percent and, for better results, about 0.1 to about 5 percent.

The amount of the main active ingredient [I] is variable with the type of the preparation. For example, the powder preparation, granules, etc. may contain about 1 to about 10 percent of a compound [I]. The wettable powder, tablets, etc. may contain about 10 to about 80 percent, preferaby about 10 to about 50 percent.

The solid preparation thus obtained is stable even when it is a mixed preparation containing carbamates insecticide as well (e.g. N-methylnaphthylcarbamate, N-methyl-3,4-dimethylphenylcarbamate, N - methyl-3-methylphenylcarbamate, etc.). Other insecticides, germicides, fungicides, herbicides, any adjuvant for agricultural preparations etc. may of course be used in conjunction.

According to this invention, the solid preparation enhances the stability of the active component [I], therefore, this solid preparation is advantageously employable for the pesticidal use even after storage for a long time.

The following examples show presently preferred embodiments of this invention but are not to be construed as restrictive. It is to be understood that the following examples are solely for the purpose of illustration and not for limitation of this invention, and that variations may be resorted to without departing from the spirit and scope of this invention.

The foregoing findings will be more particularly described by the following examples, where compound designated (1), (2) . . . means the aforesaid carbamoyl derivatives carrying the corresponding numerals.

EXAMPLE 1

2% dusts of Compound 1 are prepared, each containing prescribed concentrations of the respective stabilizers, shown in Table 2 below employing clay as the carrier. The preparing processes are as follows:

The respective stabilizers are dissolved in methanol to make their concentrations 10%, then the respective solutions are mixed with comminuted clay. As the mixing instruments, a V-mixer is used to effect crude mixing and a flash mixer to effect a full mixing. Each test dust is stored in a tightly sealed glass bottle, and residual percent of the active ingredient is measured.

Assay method

A 5-gram sample of the dust is extracted with methanol to separate the Test Compound 1 and its degradation product. The amount of said degradation product (Nereistoxin) in the methanolic solution is determined by polarography. Then, an alkali is added to the above extract to hydrolyze the Compound 1 and the total amount of the degradation product (Nereistoxin) is similarly determined by polarography. The percent residue of the Test Compound 1 is calculated from the difference.

The results are set forth in Table 2.

TABLE 2.—STABILITY TEST ON 2% DUSTS OF TEST COMPOUND (1)*

| | Percent | | |
| --- | --- | --- | --- |
| Kinds of stabilizer | Addition | Residue after 2 days at 60° C. | Residue after 17 days at 60° C. |
| Oxalic acid | 0.1 | 80.6 | 20.8 |
| | 0.3 | 91.2 | 75.4 |
| | 0.5 | 93.3 | 88.8 |
| Citric acid | 0.1 | 87.8 | 28.4 |
| | 0.3 | 92.6 | 87.1 |
| | 0.5 | 95.4 | 91.8 |
| Tartaric acid | 0.1 | 92.4 | 80.3 |
| | 0.3 | 86.6 | 82.4 |
| | 0.5 | 95.3 | 94.3 |
| Succinic acid | 0.1 | 95.0 | 94.6 |
| | 0.3 | 96.2 | 95.7 |
| | 0.5 | 98.6 | 97.4 |
| None | 0 | 67.9 | 1.7 |

*Initial 10%.

EXAMPLE 2

To 20 parts by weight of the hydrochloride of the Compound 1 is added 10 parts by weight of each stabilizer shown in Table 3 below which has been comminuted with a hammer mill, and the mixture is thoroughly blended with a V-mixer. Then 970 parts by weight of air-classified clay is added, followed by rough mixing. Then a flash mixer is used to effect fine-mixing, whereupon 1000 parts by weight of a dust containing the Compound 1 is obtained.

The change in the stability of active ingredient contained as time goes is evaluated by measuring the percent residue in the same manner as in Example 1.

The results are set forth in Table 3.

TABLE 3.—STABILITY TEST ON 2% DUSTS OF TEST COMPOUND (1)*

| | Percent | | |
| --- | --- | --- | --- |
| Kinds of stabilizer | Addition | Residue after 2 days at 60° C. | Residue after 27 days at 60° C. |
| Oxalic acid | 1 | 94.5 | 88.5 |
| Citric acid | 1 | 94.7 | 88.1 |
| Tartaric acid | 1 | 95.7 | 90.1 |
| Fumaric acid | 1 | 92.5 | 90.6 |
| None | 0 | 88.8 | 17.3 |

*Initial 100%.

EXAMPLE 3

2% dusts of Compound 1 are prepared, each containing prescribed concentrations of the respective stablizers, shown in Table 4 below, employing clay as the carrier. The preparing processes are as follows:

To the comminuted hydrochloride of the Compound 1 is added each of the stabilizers and the mixture is thoroughly blended. After the addition of clay powder, the mixture is rough-mixed with a ribbon blender and, then, further mixed with a flash mixer.

The change in the stability of active ingredient contained as time goes is evaluated by measuring the percent residue in the manner described in Example 1.

The results are set forth in Table 4.

TABLE 4.—STABILITY TEST* ON 2% DUSTS OF THE COMPOUND (1)

| | | Percent residue | | |
| --- | --- | --- | --- | --- |
| Stabilizer (liquid at atm. temp.) | Percent addition | After 2 days at 60° C. | After 9 days at 60° C. | After 28 days at 40° C. |
| Diisopropyl ester of phosphoric acid | 1 | 97.6 | 93.7 | |
| | 0.5 | 96.0 | 91.0 | |
| | 0.2 | 96.4 | 81.2 | 89.0 |
| | 0.1 | 97.0 | 46.5 | |
| Tall oil fatty acid | 1 | 99.5 | 95.2 | |
| | 0.2 | 96.8 | 94.7 | 93.3 |
| | 0.1 | 72.6 | 63.4 | |
| Caprylic acid | 1 | 98.5 | 95.1 | |
| | 0.5 | 95.4 | 94.8 | |
| | 0.2 | 94.2 | 83.8 | 93.4 |
| | 0.1 | 70.5 | | |
| None | 0 | 63.2 | 0 | 83.3 |

*Initial 100%.

EXAMPLE 4

50% wettable powders of Compound 1 are prepared, each containing prescribed concentrations of the respective stabilizers shown in Table 5 and 6 below, employing water-classified clay or diatomaceous earth as the carrier. The preparing processes are as follows:

A kneader-processed mixture of each of the stabilizers and carrier is added to the comminuted hydrochloride of the Compound 1, and the resulting mixture is evenly blended with a V-mixer. The mixture is further blended with carrier to obtain a wettable powder containing said Compound 1.

Each test wettable powder is stored in a glass bottle and the change in the stability of the active ingredient contained as time goes is evaluated by measuring the percent residue values of the Compound 1 in the manner described in Example 1.

The results are set forth in Tables 5 and 6.

(1) When the carrier is water classified clay:

TABLE 5.—STABILITY TEST* ON 50% WETTABLE POWDERS OF THE COMPOUND (1)

| Stabilizer | Percent addition | Percent residue |  |  |  |  |
|---|---|---|---|---|---|---|
|  |  | After 5 days at 60° C. | After 15 days at 60° C. | After 30 days at 60° C. | After 60 days at 60° C. | After 40 days at 40° C. |
| Diisopropylester of phosphoric acid | 1 | 100.2 | 99.7 | 99.2 | 83.8 | 101.5 |
| Tall oil fatty acid | 1 | 99.6 | 99.5 | 95.3 | 80.4 | 101.1 |
| Mixture of diisopropylester of phosphoric acid, and tall oil fatty acid (1:1) | 1 | 100.0 | 100.0 | 97.3 | 85.6 | 101.9 |
| Diisopropylester of phosphoric acid | 2 | 99.8 | 100.4 | 99.1 | 90.2 | 101.1 |
| None | 0 | 98.0 | 95.0 | 82.3 | 62.7 | 79.3 |

*Initial 100%.

(2) When the carrier is diatomaceous earth:

TABLE 6.—STABILITY TEST* ON 50% WETTABLE POWDERS OF THE COMPOUND (1)

| Stabilizer | Percent addition | Percent residue |  |  |
|---|---|---|---|---|
|  |  | After 5 days at 60° C. | After 15 days at 60° C. | After 30 days at 60° C. |
| Diisopropyl ester of phosphoric acid | 1 | 100.2 | 97.5 | 94.3 |
| Tall oil fatty acid | 1 | 99.4 | 96.1 | 87.7 |
| Mixture of diisopropyl ester of phosphoric acid, and tall oil fatty acid (1:1) | 1 | 100.0 | 97.3 | 82.2 |
| None | 0 | 95.0 | 87.4 | 68.2 |

*Initial 100%.

EXAMPLE 5

To 20 parts by weight of the hydrochloride of the Compound 1 comminuted with hammer type mill is added 5 parts by weight of tall oil fatty acid, and the mixture is evenly blended. After the addition of 5 parts by weight of diisopropyl ester of phosphoric acid, the mixture is further blended. The mixture is transferred to a V-mixer, with which it is evenly mixed with 15 parts by weight of N-methyl-1-naphthylcarbamate and 955 parts by weight of talc. The entire mixture is then blended with a flash mixer to obtain 1000 parts by weight of a dust.

In the same manner as Example 1, the change in the stability of active ingredient contained as time goes is evaluated by measuring the percent residue.

The results are set forth in Table 7.

TABLE 7.—STABILITY TEST* ON THE COMPOUND (1) IN A MIXED DUST CONTAINING THE COMPOUND (1) AND N-METHYL-1-NAPHTHYLCARBAMATE (2% AND 1.5%, RESPECTIVELY)

| Stabilizer | Percent addition | Percent residue |  |
|---|---|---|---|
|  |  | After 5 days at 60° C. | After 30 days at 60° C. |
| Mixture of diisopropylester of phosphoric acid, and tall oil fatty acid (1:1) | 1 | 95.0 | 83.8 |
| None | 0 | 23.2 | 0 |

*Initial 100%.

EXAMPLE 6

To 20 parts by weight of comminuted hydrochloride of the Compound 1 are added 5 parts by weight of tall oil fatty acid and 5 parts by weight of diisopropyl ester of phosporic acid, and the mixture is thoroughly blended with a grind-type mixer.

After the addition of 15 parts by weight of the N-methylnaphthylcarbamate which has been comminuted in a hammer mill and, then 955 parts by weight of air-classified clay powder, the entire mixture is crude-mixed with a V-mixer and, then, fine-mixed with a flash mixer. The procedure gives 1000 parts by weight of a mixed dust containing said Compound 1 and N-methylnaphthylcarbamate.

The change in the stability of active ingredient contained as time goes is evaluated by measuring the percent residue of the Compound 1 in the same manner as in Example 1.

The results are set forth in Table 8.

TABLE 8.—STABILITY TEST* ON THE COMPOUND (1) IN A MIXED DUST CONTAINING THE COMPOUND (1) AND N-METHYL-1-NAPHTHYLCARBAMATE (2% AND 1.5%)

| Stabilizer | Percent addition | Percent residue |  |  |  |  |
|---|---|---|---|---|---|---|
|  |  | After 5 days at 60° C. | After 15 days at 60° C. | After 30 days at 60° C. | After 20 days at 40° C. | After 30 days at 40° C. |
| Mixture of diisopropyl-ester of phosphoric acid, and tall oil fatty acid (1:1) | 1 | 96.0 | 42.7 | 92.1 | 97.7 | 98.4 |
| None | 0 | 58.7 | 46.6 | 8.8 | 69.2 | 50.5 |

*Initial 100%.

EXAMPLE 7

To 20 parts by weight of comminuted hydrochloride of the Compound 1 is added a mixture of 3 parts by weight of tall oil-fatty acid and 7 parts by weight of diisopropyl ester of phosphoric acid and the mixture is thoroughly blended with a grind-type mixer. Then, after the addition of 20 parts by weight of the comminuted 3,4-dimethylphenyl N-methylcarbamate. The mixture is further blended with a drum blender. Then, 980 parts by weight of air-classified clay is added and the resulting mixture is rough-mixed and, then, fine-mixed with a flash mixer. The procedure yields 1000 parts by weight of a mixed dust containing both compound (1) and 3,4-dimethylphenyl N-methylcarbamate.

As in Example 1, the above mixed dust is stored in a glass bottle and the change in the stability of active ingredient in dust as time goes is evaluated by measuring the percent residue at timed intervals. The results are set forth in Table 9.

TABLE 9.—STABILITY TEST* ON THE COMPOUND (1) IN A MIXED DUST CONTAINING THE COMPOUND (1) AND 3,4-DIMETHYLPHENYL N-METHYLCARBAMATE (2% AND 2%, RESPECTIVELY)

| Stabilizer | Percent addition | Percent residue after— |  |  |  |  |
|---|---|---|---|---|---|---|
|  |  | 5 days at 60° C. | 15 days at 60° C. | 30 days at 60° C. | 20 days at 40° C. | 40 days at 40° C. |
| Mixture of diisopropyl ester of phosphoric acid, and tall oil fatty acid (7:3) | 1 | 99.5 | 95.6 | 93.3 | 102.3 | 98.7 |
| None | 0 | 75.5 | 48.8 | 35.0 | 93.8 | 88.7 |

* Initial 100%

EXAMPLE 8

To 30 parts by weight of a finely-divided powder of the oxalate of the Compound 8 is added 10 parts by weight of oleic acid and the mixture is thoroughly blended with a grind-type mixer. After the addition of 960 parts by weight of kaolin, the mixture is further blended with a ribbon blender. Upon further mixing with a flash mixer, 1000 parts by weight of a dust containing said Compound 8 is obtained. The change in the stability of active ingredient contained as time goes is evaluated by measuring the percent residue in the manner described in Example 1.

The results are set forth in Table 10.

TABLE 10.—STABILITY TEST* ON A 3% DUST OF THE OXALATE OF THE COMPOUND (8)

| | | Percent residue | | |
|---|---|---|---|---|
| Stabilizer | Percent addition | After 15 days at 60° C. | After 30 days at 60° C. | After 40 days at 40° C. |
| Oleic acid | 1.0 | 96.8 | 94.3 | 98.2 |
| None | 0 | 63.8 | 32.6 | 89.0 |

*Initial 100%

EXAMPLE 9

A mixture of 2 weight parts of the comminuted hydrochloride of the Compound 1, 1 weight part of tall oil fatty acid and 97 weight parts of clay blended in the same manner as in Example 3, is packed in the craft paper sack and stored in a storehouse without applying any special means for controlling the storing conditions. The percent residues measured after one and two years are as follows:

| | Percent | |
|---|---|---|
| | After 1 year | After 2 years |
| Test sample | 95.9 | 95.1 |
| Control | 70.2 | 56.1 |

What is claimed is:
1. A stabilized solid insecticidal composition which contains at least (1) about 1 to about 80 weight percent of an acid salt of a carbamoyl derivative represented by the formula:

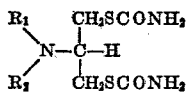

wherein $R_1$ and $R_2$ represent the same or a different lower alkyl radical having up to 6 carbon atoms, (2) about 0.01 to about 10 weight percent of an acid stabilizer selected from the group consisting of acetic acid, propionic acid, oxalic acid, citric acid, tartaric acid, succinic acid, maleic acid, capric acid, capryl acid, oleic acid, linoleic acid, linolenic acid, fumaric acid, tall oil fatty acid and diisopropyl hydrogen phosphate, and (3) about 40 to about 98 weight percent of a comminuted mineral carrier acceptable for insecticidal use.

2. The stabilized solid insecticidal composition as claimed in claim 1, wherein the acid salt of a carbamoyl derivative is 1,3-bis-carbamoylthio - 2 - dimethylaminopropane hydrochloride.

3. The stabilized solid insecticidal composition as claimed in claim 1, wherein the acid salt of a carbamoyl derivative is 1,3-bis-carbamoylthio - 2 - methylethylaminopropane hydrochloride.

4. The stabilized solid insecticidal composition as claimed in claim 1, wherein the acid stabilizer is oxalic acid.

5. The stabilized solid insecticidal composition as claimed in claim 1, wherein the acid stabilizer is citric acid.

6. The stabilized solid insecticidal composition as claimed in claim 1, wherein the acid stabilizer is tartaric acid.

7. The stabilized solid insecticidal composition as claimed in claim 1, wherein the acid stabilizer is succinic acid.

8. The stabilized solid insecticidal composition as claimed in claim 1, wherein the acid stabilizer is caprylic acid.

9. The stabilized solid insecticidal composition as claimed in claim 1, wherein the acid stabilizer is tall oil fatty acid.

10. The stabilized solid insecticidal composition as claimed in claim 1, wherein the acid stabilizer is diisopropyl hydrogen phosphate.

11. The stabilized solid insecticidal composition as claimed in claim 1, wherein the acid stabilizer is a mixture of diisopropyl hydrogen phosphate and tall oil fatty acid in a parts by weight ratio of 1:1.

References Cited

UNITED STATES PATENTS
3,332,943   7/1967   Konishi et al. ____ 260—243 B

FOREIGN PATENTS
260,591   7/1962   Australia _____ 424—286

OTHER REFERENCES

Kirk-Othmer Encyc. of Chem. Tech., vol. 1 (1963), 2nd ed., pp. 226, 229.

ALBERT T. MEYERS, Primary Examiner

V. D. TURNER, Assistant Examiner

U.S. Cl. X.R.

424—246, 248, 267, 274